(12) United States Patent
Kupe et al.

(10) Patent No.: US 7,584,603 B2
(45) Date of Patent: Sep. 8, 2009

(54) METHOD AND SYSTEM FOR REGENERATING NO$_x$ ADSORBERS AND/OR PARTICULATE FILTERS

(75) Inventors: Joachim Kupe, Davisburg, MI (US); James Zizelman, Honeoye Falls, NY (US); Jean J. Botti, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/017,020

(22) Filed: Dec. 20, 2004

(65) Prior Publication Data

US 2005/0103001 A1    May 19, 2005

Related U.S. Application Data

(63) Continuation of application No. 10/301,455, filed on Nov. 21, 2002, now Pat. No. 6,832,473.

(51) Int. Cl.
*F01N 3/00* (2006.01)

(52) U.S. Cl. .............................. 60/274; 60/286; 60/295; 60/297; 60/303; 60/311; 422/172; 422/177; 422/182

(58) Field of Classification Search .................. 60/274, 60/275, 286, 295, 297, 301, 303, 300, 311; 422/171, 172, 177, 182
See application file for complete search history.

(56) References Cited

U.S. PATENT DOCUMENTS

| | | | |
|---|---|---|---|
| 4,576,617 A * | 3/1986 | Renevot ...................... 95/279 |
| 5,412,946 A * | 5/1995 | Oshima et al. ................ 60/286 |
| 5,437,250 A * | 8/1995 | Rabinovich et al. ............ 123/3 |
| 5,974,791 A * | 11/1999 | Hirota et al. ................... 60/276 |
| 6,021,639 A * | 2/2000 | Abe et al. ...................... 60/297 |
| 6,167,696 B1 * | 1/2001 | Maaseidvaag et al. ......... 50/274 |
| 6,199,373 B1 * | 3/2001 | Hepburn et al. ............... 60/274 |
| 6,202,407 B1 * | 3/2001 | Brusasco et al. .............. 60/274 |
| 6,471,924 B1 * | 10/2002 | Feeley et al. ............. 423/213.5 |
| 6,508,057 B1 * | 1/2003 | Bouchez et al. ............... 60/286 |
| 6,560,958 B1 * | 5/2003 | Bromberg et al. ............. 60/275 |
| 6,718,753 B2 * | 4/2004 | Bromberg et al. ............. 60/275 |
| 6,742,328 B2 * | 6/2004 | Webb et al. ................... 60/285 |

(Continued)

FOREIGN PATENT DOCUMENTS

DE           3917983           12/1990

(Continued)

OTHER PUBLICATIONS

EP search Report mailed Jan. 28, 2009.

*Primary Examiner*—Tu M Nguyen
(74) *Attorney, Agent, or Firm*—Paul L. Marshall

(57) ABSTRACT

An active system for regenerating a NOx adsorber and a particulate filter, the system includes a fuel source, a reformer for generating hydrogen and carbon monoxide in fluid communication with the fuel source, a first valve, a second valve, and a third valve in fluid communication with the reformer, an oxidation catalyst, a NOx adsorber located downstream from the oxidation catalyst, a particulate filter located downstream from the NOx adsorber; and wherein the first valve, the second valve, and the third valve control fluid flow from the reformer to the oxidation catalyst, the NOx adsorber, and the particulate filter.

12 Claims, 4 Drawing Sheets

U.S. PATENT DOCUMENTS

| | | | |
|---|---|---|---|
| 6,758,035 B2 * | 7/2004 | Smaling | 60/285 |
| 6,813,882 B2 * | 11/2004 | Hepburn et al. | 60/286 |
| 6,832,473 B2 * | 12/2004 | Kupe et al. | 60/286 |
| 6,895,746 B2 * | 5/2005 | Buglass et al. | 60/286 |
| 7,021,048 B2 * | 4/2006 | Taylor et al. | 60/295 |
| 7,137,246 B2 * | 11/2006 | van Nieuwstadt et al. | 60/295 |
| 7,188,469 B2 * | 3/2007 | Bonadies et al. | 60/286 |
| 7,240,484 B2 * | 7/2007 | Li et al. | 60/286 |
| 2003/0140622 A1 * | 7/2003 | Taylor et al. | 60/295 |
| 2003/0200742 A1 * | 10/2003 | Smaling | 60/275 |

FOREIGN PATENT DOCUMENTS

| | | |
|---|---|---|
| DE | 10018792 | 9/2001 |
| EP | 0893154 | 1/1999 |
| EP | 1055806 | 11/2000 |
| WO | 0114698 | 3/2001 |
| WO | 0194759 | 12/2001 |
| WO | 03064835 | 8/2003 |

* cited by examiner

METHOD AND SYSTEM FOR REGENERATING $NO_x$ ADSORBERS AND/OR PARTICULATE FILTERS

This is a continuation of U.S. patent application Ser. No. 10/301,455, filed Nov. 21, 2002 now U.S. Pat. No. 6,832,473.

BACKGROUND

This disclosure relates generally to a method and system for regenerating and/or desulfating $NO_x$ adsorbers and/or regenerating particulate filters.

In general, diesel engines generally emit less nitrogen oxides (NOx) than a gasoline engine under most conditions, but because diesel engines mostly or exclusively operate on a high air to fuel ratio, the chemistry of the exhaust gas does not favor NOx reduction, because of the excess of oxidizing species. Thus, the reduction of nitrogen oxides, e.g., nitric oxide (NO), nitrogen dioxide ($NO_2$), and nitrous oxide ($N_2O$), in exhaust gas is a widely addressed problem as a result of environmental concerns and mandated government emissions regulations, particularly in the transportation industry. One proposed solution is the use of a three-way conversion catalyst, which can be employed to treat the exhaust gases. Such three-way conversion catalysts, contain precious metals such as platinum, palladium, and rhodium, and can promote the oxidation of unburned hydrocarbons and carbon monoxide, and the reduction of nitrogen oxides in exhaust gas provided that the engine is operated around a balanced stoichiometry for combustion (also referred to as "combustion stoichiometry"). The balanced combustion stoichiometry is typically at an air to fuel ratio between about 14.4 to about 14.7.

However, fuel economy and global carbon dioxide emission concerns have made engine operation under lean-burn conditions desirable in order to realize a benefit in fuel economy. Under such lean-burn conditions, the air-to-fuel ratio may be greater than the balanced combustion stoichiometry, i.e., greater than about 14.7 and may be between about 19 to about 35. When lean-burn conditions are employed, three-way conversion catalysts are generally efficient in oxidizing the unburned hydrocarbons and carbon monoxide s, but are generally inefficient in the reduction of nitrogen oxides.

One approach for treating nitrogen oxides in exhaust gases is to incorporate a $NO_x$ adsorber, also referred to as a "lean-$NO_x$ trap," in the exhaust lines. The $NO_x$ adsorber promotes the catalytic oxidation of nitrogen oxides by catalytic metal components effective for such oxidation, such as precious metals. The formation of $NO_2$ is generally followed by the formation of a nitrate when the $NO_2$ is adsorbed onto the catalyst surface. The $NO_2$ is thus "trapped", i.e., stored, on the catalyst surface in the nitrate form. The system can be periodically operated under fuel-rich combustion to regenerate the $NO_x$ adsorber. During this period of fuel-rich combustion, the absence of oxygen and the presence of a reducing agent promote the release and subsequent reduction of the stored nitrogen oxides. However, this period of fuel-rich combustion may also result in a significant fuel penalty.

As previously mentioned, exhaust gas streams can further comprise particulate matter such as carbon-containing particles or soot. A particulate filter, commonly used with compression ignition engines, can be used to prevent the carbon particles or the soot from exiting a tailpipe. The particulate filter may be a stand-alone device separate and distinct from devices employing catalytic elements for removing undesirable $NO_x$ gaseous components. Carbon particles can be trapped in the particulate filter and then periodically burned to regenerate the filter.

Regeneration of particulate filters can be accomplished by the use of auxiliary devices such as a burner or other heating element. For example, an air-fuel nozzle and an ignition device can be used and operated, when desired, to heat the exhaust gases and the particulate filter to a combustion temperature of the trapped particulate matter. In this manner, the trapped particulate matter can be burned from the filter surfaces to permit a continuous flow of the exhaust gases. Alternatively, an electric heater can be used to generate the heat to initiate the combustion of the trapped particulates. However, these approaches are limited by their energy efficiency, durability, and cost.

BRIEF SUMMARY

Disclosed herein is a system for regenerating and/or desulfating a NOx adsorber and/or a system for regenerating a particulate filter. The system comprises regeneration system comprising an exhaust conduit in fluid communication with an exhaust fluid from an engine, wherein the exhaust conduit comprises a first oxidation catalyst, a NOx adsorber, and a second oxidation catalyst coupled to a particulate filter; a fuel source in fluid communication with a reformer, wherein the reformer is adapted to generate a hydrogen and carbon monoxide containing fluid from a fuel supplied by the fuel source; a regeneration conduit in fluid communication with the exhaust conduit and the reformer; and valve means disposed in the regeneration conduit for selectively controlling and directing the hydrogen and carbon monoxide containing fluid from the reformer to the first oxidation catalyst, the coupled second oxidation catalyst and particulate filter, the NOx adsorber, or a combination thereof.

In accordance with another embodiment, a regeneration system comprises an exhaust conduit in fluid communication with an exhaust fluid from an engine, wherein the exhaust conduit comprises a first oxidation catalyst, a second oxidation catalyst coupled to a NOx adsorber, and a third oxidation catalyst coupled to a particulate filter; a fuel source in fluid communication with a reformer, wherein the reformer is adapted to generate a hydrogen and carbon monoxide containing fluid from a fuel supplied by the fuel source; a regeneration conduit in fluid communication with the exhaust conduit and the reformer; and valve means disposed in the regeneration conduit for selectively controlling and directing the hydrogen and carbon dioxide containing fluid from the reformer to the first oxidation catalyst, the second oxidation catalyst coupled to the NOx adsorber, and the third oxidation catalyst coupled to the particulate filter, or a combination thereof.

A process for regenerating and desulfating a $NO_x$ adsorber and/or a regenerating a particulate filter comprises periodically supplying a fuel to a reformer; converting said fuel to a hydrogen and carbon monoxide containing fluid; selectively feeding the hydrogen and carbon monoxide containing fluid into an oxidation catalyst or into a NOx adsorber, or into the oxidation catalyst and the NOx adsorber catalyst; and generating an exotherm in the oxidation catalyst and heating an exhaust fluid passing therethrough to a temperature effective to regenerate a particulate filter disposed downstream from the oxidation catalyst or reducing nitrogen oxides adsorbed by the NOx adsorber or generating the exotherm in the oxidation catalyst and heating the exhaust fluid to the temperature effective to regenerate the particulate filter downstream from the oxidation catalyst and reducing the nitrogen oxides trapped by the NOx adsorber.

The above-described and other features will be appreciated and understood by those skilled in the art from the following detailed description, drawings, and appended claims.

BRIEF DESCRIPTION OF THE DRAWINGS

Referring now to the figures, which are exemplary embodiments and wherein like elements are numbered alike.

DETAILED DESCRIPTION

Figures 1, 2:
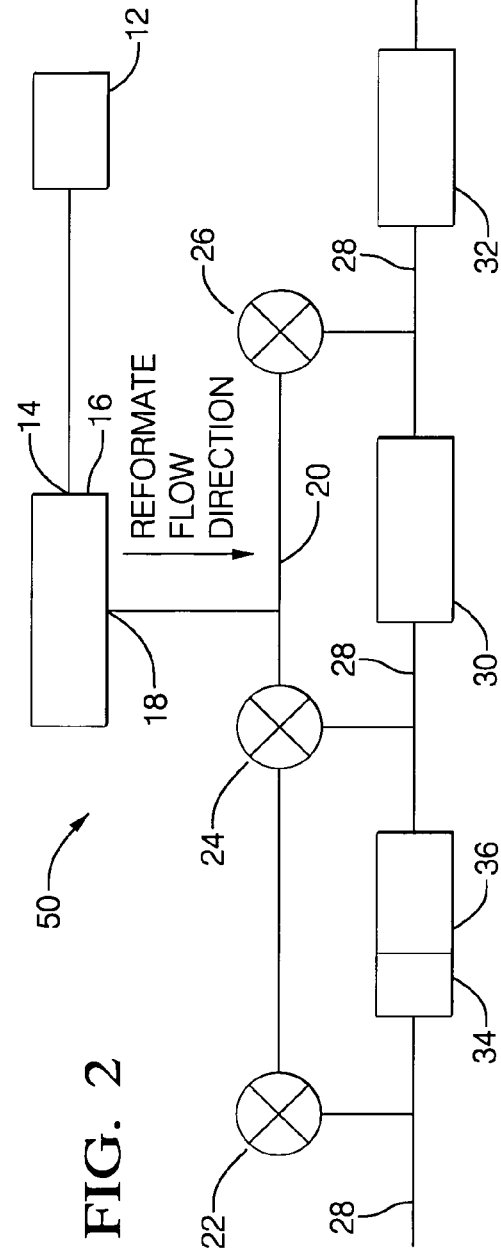
FIG. 1 is a schematic view of a regeneration and/or desulfating system for light duty diesel architecture.
FIG. 2 is a schematic view of a regeneration and/or desulfating system for heavy duty diesel architecture.

Referring now to FIG. 1, a system, generally designated 10, for regenerating a particulate filter and/or for regenerating and/or desulfating a NOx adsorber is shown. System 10 depicts a preferred architecture for light-duty diesel architecture applications, e.g., passenger cars. The system 10 generally comprises a fuel source 12 in fluid communication with an inlet 14 of a reformer 16. An outlet 18 of the reformer 16 is fluidly connected to a reformer conduit 20. The general flow of reformate from the reformer 16 is indicated by an arrow labeled reformate flow direction. Valves 22, 24, and 26 are disposed in the reformer conduit 20 to selectively provide fluid communication from the reformer 16 to an exhaust conduit 28. Disposed in serial fluid communication within the exhaust conduit 28 are an oxidation catalyst 30, an NOx adsorber 32, and an oxidation catalyst 34 coupled to a particulate filter 36. Valve 22 provides controlled fluid communication from the reformer 16 to the oxidation catalyst 30. Valve 24 provides controlled fluid communication from the reformer 16 to the NOx adsorber 32. Valve 26 provides controlled fluid communication from the reformer 16 to the coupled oxidation catalyst 34 and particulate filter 36. For light-duty applications, the general directional flow of exhaust fluid from an engine (as shown by an arrow labeled exhaust flow direction) is through the oxidation catalyst 30, the NOx adsorber 32, and then the coupled oxidation catalyst 34 and particulate filter 36. The fluid passing through the exhaust conduit 28 is then discharged into the external environment.

FIG. 2 illustrates system 50, which provides architecture for heavy-duty diesel architecture applications, e.g., over the highway tractors, trucks, and the like. In system 50, the oxidation catalyst 30, the $NO_x$ adsorber 32, and the coupled oxidation catalyst 34 and particulate filter 36 are disposed in serial fluid communication within the exhaust conduit 28. Thus, the general directional flow of exhaust fluid (as shown by an arrow labeled exhaust flow direction) from the engine to the external environment is through the coupled oxidation catalyst 34 and particulate filter 36, then through the oxidation catalyst 30, and then through the $NO_x$ adsorber 32.

Fuel source 12 preferably includes hydrocarbon fuels, including, but not limited to, liquid fuels, such as gasoline, diesel, ethanol, methanol, kerosene, and others; gaseous fuels, such as natural gas, propane, butane, and others; and alternative fuels, such as hydrogen, biofuels, dimethyl ether, and others; and mixtures of at least one of the foregoing fuels. The selection of fuel source 12 is based upon application, expense, availability, and environmental issues relating to fuel source 12.

Reformer 16 generates a reformate gas from the fuel source 12. The reformate includes hydrogen, carbon monoxide, and other byproducts that may include carbon dioxide. Reformer 16 may be configured for partial oxidation, steam reforming, or dry reforming. Preferably, reformer 16 is configured for partial oxidation.

Partial oxidation reformers are based on sub-stoichiometric combustion to achieve the temperatures necessary to reform the hydrocarbon fuel. Decomposition of fuel to primarily hydrogen and carbon monoxide occurs through thermal reactions at temperatures of about 700° C. to about 1,000° C. Catalysts can be used with partial oxidation systems (catalytic partial oxidation) to promote conversion of various sulfur-free fuels, such as ethanol, into a synthetic gas. The use of the catalyst can result in acceleration of the reforming reactions and can provide this effect at lower reaction temperatures than those that would otherwise be required in the absence of a catalyst. An example of the partial oxidation reforming reaction is as follows:

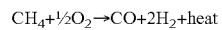
$$CH_4 + \tfrac{1}{2}O_2 \rightarrow CO + 2H_2 + \text{heat}$$

In contrast, steam configured reformers react fuel and steam ($H_2O$) in heated tubes filled with catalysts to convert hydrocarbons in the fuel into primarily hydrogen and carbon monoxide. An example of the steam reforming reaction is as follows:

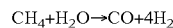
$$CH_4 + H_2O \rightarrow CO + 4H_2$$

Dry reforming systems form hydrogen and carbon monoxide in the absence of water, for example, by using carbon dioxide. An example of the dry reforming reaction is depicted in the following reaction:

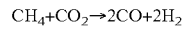
$$CH_4 + CO_2 \rightarrow 2CO + 2H_2$$

Reformer 16 preferably comprises a catalyst and a substrate. The catalyst can be washcoated, imbibed, impregnated, physisorbed, chemisorbed, precipitated, or otherwise applied to the substrate. Possible catalyst materials include metals, such as platinum, palladium, rhodium, iridium, osmium, ruthenium, and the like, and oxides, mixtures, and alloys comprising at least one of the foregoing metals.

The reformer substrate is preferably capable of operating at temperatures up to about 1,200° C.; capable of withstanding reducing and oxidizing environments containing, for example, hydrocarbons, hydrogen, carbon monoxide, water, oxygen, sulfur and sulfur-containing compounds, combustion radicals, such as hydrogen and hydroxyl ions, and the like, and carbon particulate matter; and has sufficient surface area and structural integrity to support the desired catalyst.

Materials that can be used as the reformer substrate include alumina, zirconia, cordierite, silicon carbide, metals (e.g., stainless steel, aluminum, and the like), as well as oxides, alloys, cermets, and mixtures comprising at least one of the foregoing materials, with alumina, zirconia, and mixtures comprising alumina and/or zirconia preferred.

Although the reformer substrate can have any size or geometry, the size and geometry are preferably chosen to optimize the surface area in the given catalytic converter design parameters. The reformer substrate can have an open cell foam structure, or an extruded honeycomb cell geometry, with the cells being any multi-sided or rounded shape, with substantially square, hexagonal, octagonal or similar geometries preferred due to increased surface area and structural integrity. The substrate is formed into a cell structure with a plurality of cells arranged in a honeycomb pattern using a foam process, and the like.

The oxidation catalyst, 30 or 34, preferably comprises a catalytic metal including, but not limited to, platinum, palladium, ruthenium, rhodium, osmium, iridium, gold, silver, aluminum, gallium, indium, tin, titanium, and other metals, as well as oxides, alloys, salts, and mixtures comprising at least one of the foregoing metals. Moreover, the catalyst utilized for the oxidation catalyst 30 or 34 may also be employed as the catalyst in the $NO_x$ adsorber 32 and particulate filter 36.

The $NO_x$ adsorber 32 generally comprises a porous support, a catalytic metal component, and one or more $NO_x$ trapping materials. Suitable NOx trapping materials include alkali metals, alkaline earth metals, and the like, and combinations comprising at least one of the foregoing. The catalytic metal component and $NO_x$ trapping materials can be washcoated, imbibed, impregnated, physisorbed, chemisorbed, precipitated, or otherwise applied onto and/or within the porous support.

The porous support can comprise any material designed for use in a spark ignition or diesel engine environment. Preferably, the porous support is selected to be capable of operating at temperatures up to about 1,200° C.; capable of withstanding exposure to hydrocarbons, nitrogen oxides, carbon monoxide, carbon dioxide, sulfur and/or sulfur oxides; and has sufficient surface area and structural integrity to support the desired catalyst. Some possible materials include zirconium toughened alumina, cordierite, silicon carbide, metallic foils, alumina sponges, porous glasses, and the like, and mixtures comprising at least one of the foregoing materials, with zirconium toughened alumina preferred.

Although the porous support can have any size or geometry, the size and geometry are preferably chosen to optimize surface area in the given catalytic converter design parameters. Generally, the porous support has a honeycomb geometry, with the combs being any multi-sided or rounded shape, with substantially square, triangular, hexagonal, or similar geometries preferred due to ease of manufacturing and increased surface area.

The porous support further comprises one or more other support materials suitable for use at the high operation temperatures associated with an internal combustion engine (e.g., up to about 1,200° C.). Such materials include, but are not limited to, aluminates (e.g., hexaaluminates), alumina, and the like, as well as combinations comprising at least one of the foregoing, with gamma-alumina, theta-alumina, delta-alumina, and combinations thereof being preferred.

The catalytic metal component comprises precious metals, such as, platinum, rhodium, palladium, ruthenium, iridium and osmium, as well as alloys and combinations comprising at least one of the foregoing metals. Where the catalytic metal component is a combination of rhodium with one or more other metals, the other metals, e.g., palladium, platinum, and the like, are typically present in an amount less than the rhodium. More particularly, with a a platinum/rhodium combination, the catalytic metal component can comprise up to about 95 wt % rhodium and up to about 30 wt % platinum; with about 70 wt % to about 85 wt % rhodium and about 2.5 wt % to about 20 wt % platinum preferred; and about 70 wt % to about 80 wt % rhodium and about 5 wt % to about 10 wt % platinum especially preferred, weight percent based on the total weight of the alloy.

In addition to the catalytic metal component, the porous support may be further loaded with one or more $NO_x$ trapping materials, such as alkali metals, alkaline earth metal, and mixtures comprising at least one of the foregoing metals. Suitable trapping materials include barium, lithium, potassium, magnesium, sodium, cesium, strontium, and combinations comprising at least one of the foregoing, with a mixture of barium and potassium being preferred.

The particulate filter 36 generally comprises a shell, an insulation material, and a filter element. The insulation material substantially covers the filter element, and the shell substantially covers the insulation material.

Possible materials for the shell include ferrous materials, such as ferritic stainless steels. Ferritic stainless steels include stainless steels such as the 400-Series, for example, SS-409, SS-439, and SS-441, and alloys, and combinations comprising at least one of the foregoing stainless steels, with grade SS-409 generally preferred.

The insulation material comprises materials such as fiberglass, intumescent materials, non-intumescent materials, ceramic mats, and/or mica based materials, including combinations comprising at least one of the foregoing insulation materials, and the like.

The filter element can comprise one or more monoliths, substrates, supports, and the like, comprising a ceramic, metallic, cermet, and carbides, silicides, nitrides, such as silicon carbide, silicon nitride, and the like, or composite material, and the like, and combinations comprising at least one of the foregoing materials. Such materials preferably possess a sufficient porosity to permit passage of reformate through the monolith walls, and yet filter out a substantial portion, if not all of the particulate matter present in the exhaust.

Preferably, the filter element includes a catalyst material such as precious metals such as platinum, palladium, rhodium, nickel, iron, cobalt, molybdenum, tungsten, vanadium, niobium, tantalum, their oxides and sulfides, and combinations comprising at least one of the foregoing precious metals and the like. Further, the filter element can optionally include a washcoat material such as aluminum oxide, silicon oxide, zirconium oxide, titanium oxide, cerium oxide, combinations comprising at least one of the following washcoat materials, and the like.

In operation of system 10, 50, the reformer 16 converts the fuel from the fuel source 12 to produce a reformate including, among other products, hydrogen and carbon monoxide gases. In a preferred embodiment, the reformer is a partial oxidation reformer. The reformate as it exits the reformer 16 is preferably at a temperature of about 1,000° C. or less. Depending on the particular system architecture, the system may include an optional heat exchanger to reduce the reformate temperature to a temperature effective to cause regeneration and or desulfurization of the particulate component, e.g., NOx adsorber 32, particulate filter 36, and the like. The heated reformate can then be used to regenerate and desulfate $NO_x$ adsorber 32 and/or regenerate the particulate filter 36. For example, in system 10, when valve 24 is open (valves 22, 26 closed), hydrogen and carbon monoxide from the reformer 16 can be fed directly to the exhaust fluid stream entering the $NO_x$ adsorber 32. The heated reformate allows the NOx adsorber to be regenerated using hydrogen and carbon monoxide . Preferably, the reformate is at a temperature of about 200° C. to about 600° C. as it enters the NOx adsorber 32, with about a temperature of about 300° C. to about 500° C. even more preferred, with a temperature at about 400° C. most preferred. Valve 24 can be programmed to provide intermittent flow, i.e., a pulse, of hydrogen and carbon monoxide into $NO_x$ adsorber 32. Valve 24 allows hydrogen and carbon monoxide to flow to $NO_x$ adsorber 32 as needed for regeneration, which can also reduce the amount of fuel consumed during regeneration, when compared to other regeneration processes that use direct injection of fuel as the reducing agent. (In system 50, valve 26 is opened and valves 22, 24 are closed to provide a similar regeneration of the NOx adsorber contained therein.) Additionally, the hydrogen and carbon monoxide can be used for desulfurization purposes. For example, in system 10 when valve 22 is opened hydrogen and carbon monoxide from reformer 16 is fed to oxidation catalyst 30. Reaction of the hydrogen with the oxidation catalyst creates an exotherm, which heats the exhaust fluid flowing into the NOx adsorber 32. The exotherm is preferably sufficient to heat the exhaust fluid to a temperature effective to remove sulfur from $NO_x$ adsorber 32. Preferably, the exhaust fluid as it enters the NOx adsorber 32 is at a temperature of about 60° C. to about 1,000° C., and with about 260° C. to about 460° C. more preferred. Likewise, in system 50, valve 24 is opened instead of, or in combination with valve 26 to regenerate the oxidation catalyst.

The hydrogen gas generated in the reformer 16 can also be used to regenerate the particulate filter 36. As previously mentioned, the particulate filter 36 is coupled to an oxidation catalyst 34, which contains a catalyst material and creates an exotherm. The exotherm preferably raises the temperature to a temperature less than or equal to about 550° C., and with less than or equal to about 500° C. more preferred. The heat generated initiates combustion of trapped particulates in the particulate filter 36.

Figure 3:
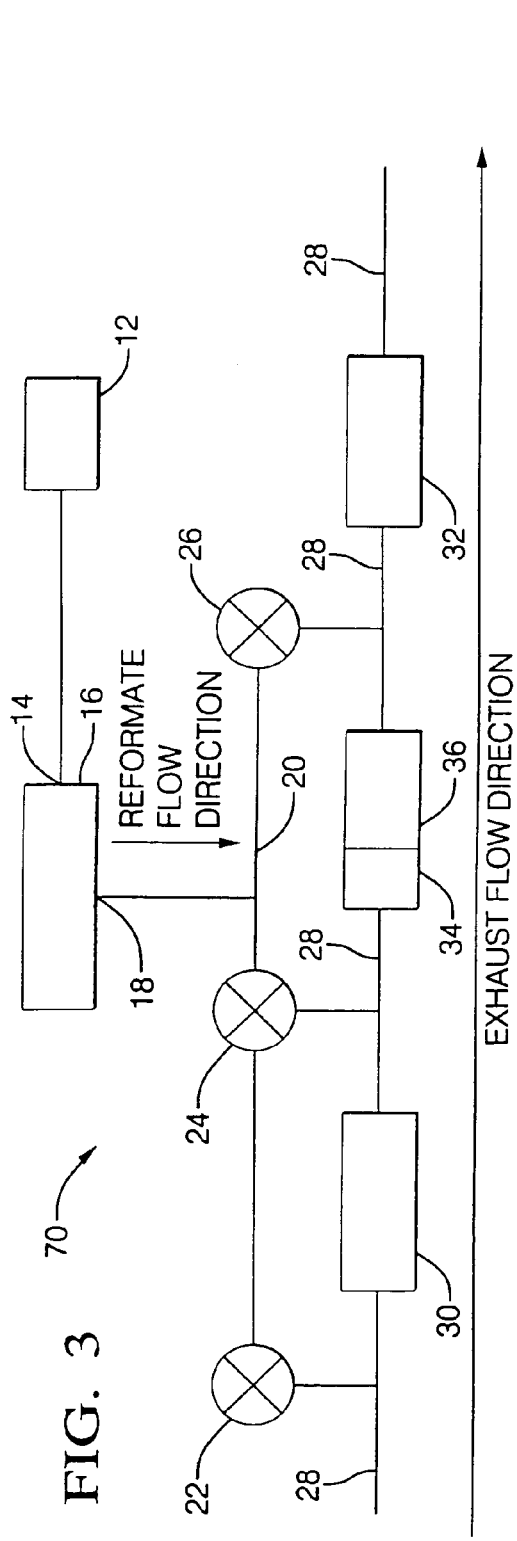
FIG. 3 a schematic view of a system for regenerating a NOx adsorber in accordance with a third embodiment.
Figure 4:
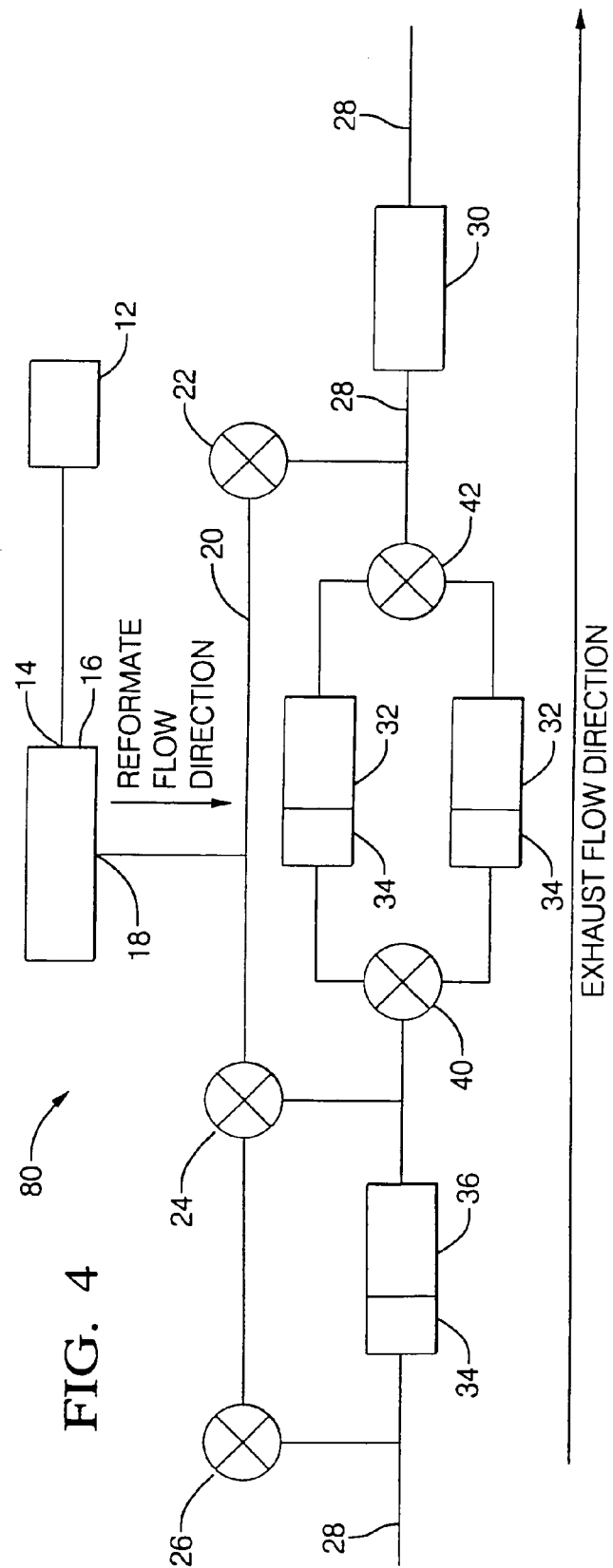
FIG. 4 is a schematic view of a system for regenerating a NOx adsorber in accordance with a fourth embodiment.
Figure 5:
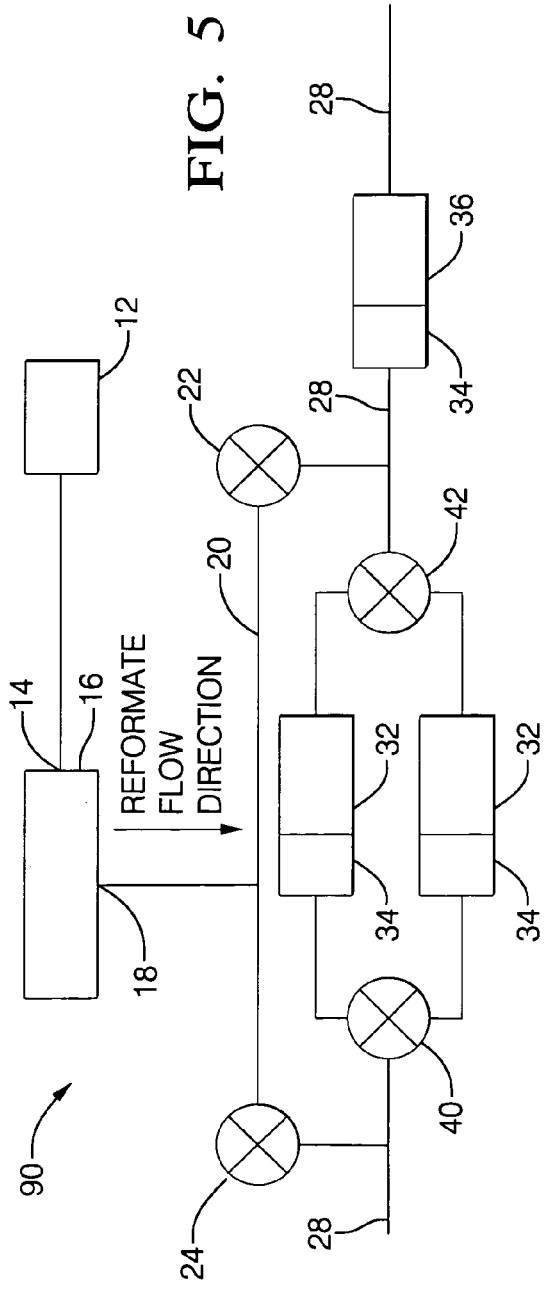
FIG. 5 is a schematic view of a system for regenerating a NOx adsorber in accordance with a fifth embodiment.
Figure 6:
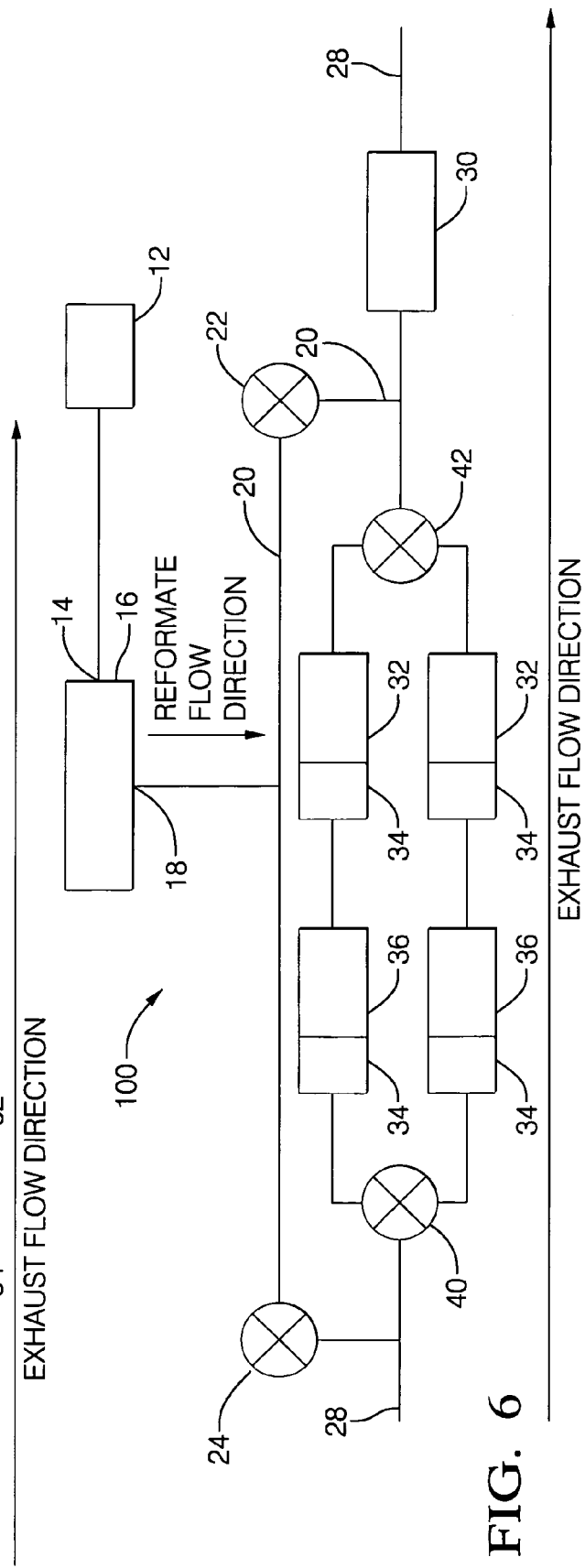
FIG. 6 is a schematic view of a system for regenerating a NOx adsorber in accordance with a sixth embodiment.
Figure 7:
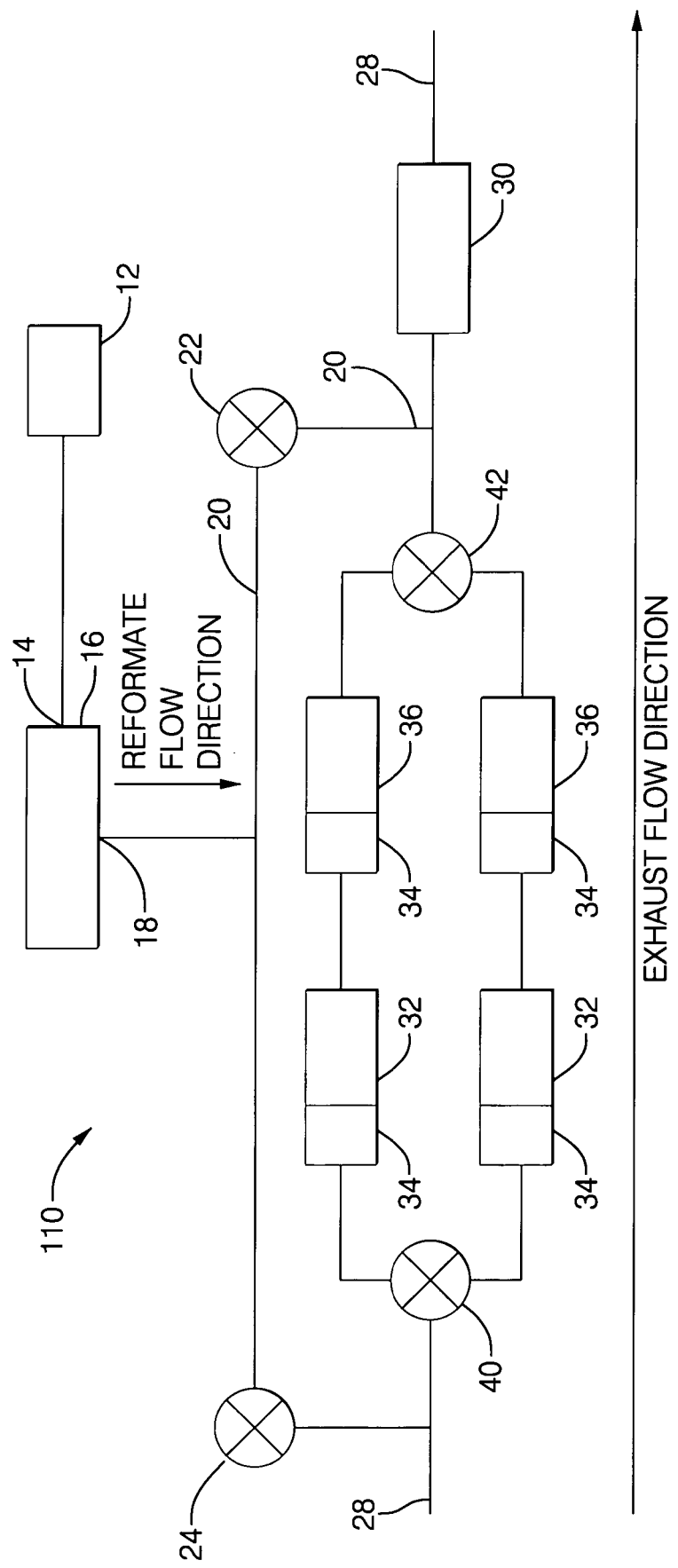
FIG. 7 is a schematic view of a system for regenerating a NOx adsorber in accordance with a seventh embodiment.

Other possible system architectures are schematically illustrated in FIGS. 3-6, wherein opening and closing selected valves can be used to periodically regenerate and/or desulfurize the various components of the system. FIG. 3 illustrates system 70, wherein the $NO_x$ adsorber 32, the coupled oxidation catalyst 34 and particulate filter 36, and the oxidation catalyst 30, are serially disposed in the exhaust conduit 28. In this embodiment, exhaust from an engine flows through the serially disposed components, wherein the reformer 16 can be used to selectively regenerate the NOx adsorber 32 and/or particulate filter 36 and/or desulfurized the NOx adsorber 32

FIGS. 4-7 schematically illustrate various system architectures 80, 90, 100, 110, wherein additional valves 40 and 42 are employed to direct the exhaust flow into a selected one of a duplicate component to provide system redundancy. Reformate is selectively injected into the selected system component by opening the appropriate valve. In this manner, regeneration can occur for the selected system component.

The valves 22, 24, and 26 are preferably in electrical communication with an on-board computer. The computer can be programmed such that the NOx adsorber 32 can be regenerated and/or desulfated, or the particulate filter 36 can be regenerated as need. For example, in system 10, the computer can be programmed to open and/or close any of the valves 22, 24, and/or 26 based upon operating conditions such as idle speed or load, exhaust temperature, pressure differential across the diesel particulate filter, or it can be a time based program. One skilled in the art will appreciate that embodiments of the above mentioned systems could be used for processes that include desulfurization and regeneration of a $NO_x$-adsorber, regeneration of a particulate filter, and the like.

Advantageously, the system provides on-demand regeneration capabilities for the oxidation catalyst 30 or 34, the NOx adsorber 32, and/or the particulate filter 36. Additional chemicals do not have to be carried on-board, since reformer 16 can readily produce hydrogen and carbon monoxide, as needed. Further, the use of hydrogen and carbon monoxide also increases $NO_x$ performance at lower temperatures as well as particulate filter regeneration at lower exhaust temperatures. Another advantage may be an increase in fuel efficiency when compared to rich-combustion reduction of a $NO_x$ adsorber. Yet another advantage may be reducing platinum and rhodium loading of the $NO_x$ adsorber, which may lead to substantial cost savings.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A process for regenerating and desulfating a $NO_x$ adsorber in an engine and exhaust system, comprising the steps of:

providing an exhaust conduit in fluid communication with an exhaust outlet of the engine;

supplying a hydrogen- and carbon monoxide-containing fluid from a source of reformate into the exhaust conduit upstream of the NOx adsorber, said source of reformate being in parallel flow with an exhaust conduit;

controllably flowing said hydrogen- and carbon monoxide-containing fluid into said exhaust conduit wherein said fluid reacts with NOx contained in the NOx adsorber, thereby chemically reducing the NOx to form gaseous nitrogen;

exhausting the gaseous nitrogen from the system;

providing a first oxidation catalyst device upstream of said NOx adsorber controllably flowing said hydrogen- and carbon monoxide-containing fluid into said exhaust conduit upstream of said first oxidation device; and generating an exotherm in the first oxidation catalyst device and heating an exhaust fluid passing therethrough to a temperature effective to desulfate the NOx adsorber.

2. The process of claim 1, wherein said source of reformate is a partial oxidation reformer.

3. The process of regenerating a particulate filter, and regenerating and desulfating a $NO_x$ adsorber in an engine and exhaust system as in claim 1, further comprising:

providing a second oxidation catalyst device downstream of the $NO_x$ adsorber and upstream of the particulate filter, the second oxidation catalyst device being separate from the particulate filter;

controllably flowing said hydrogen- and carbon monoxide-containing fluid into said exhaust conduit upstream of the second oxidation device; and generating an exotherm in the second oxidation catalyst device and heating an exhaust fluid passing therethrough to a temperature effective to combust trapped particles in the particulate filter.

4. The process of claim 1, wherein said $NO_x$ adsorber comprises a support, a catalytic metal component, and a $NO_x$ trapping material.

5. The process of claim 4, wherein said catalytic metal is selected from the group consisting of platinum, palladium, rhodium, iridium, osmium, ruthenium, tantalum, zirconium, yttrium, cerium, aluminum, nickel, copper, and mixtures thereof.

6. The process of claim 4, wherein said support is a porous material selected from the group consisting of alumina, gamma-alumina, zirconia, alpha-alumina, magnesium oxide cerium oxide, zirconium oxide, lanthanum oxide, yttrium oxide, neodymium oxide, and mixtures thereof.

7. An exhaust system for controlling NOx emissions from an engine comprising:
   an exhaust conduit in fluid communication with an exhaust outlet on said engine;
   a source of reformate adapted to provide a hydrogen- and carbon monoxide-containing fluid;
   a NOx adsorber having an inlet in fluid communication with said exhaust conduit, and an outlet, said source of reformate having an outlet in fluid communication with said exhaust conduit upstream of said NOx adsorber
   a first oxidation catalyst device having an inlet in fluid communication with said exhaust conduit, and an outlet in fluid communication with said NOx adsorber inlet, said outlet of said source of reformate in fluid communication with said exhaust conduit upstream of said first oxidation catalyst;
   a first valve in flow communication with said source of reformate for controlling said hydrogen- and carbon monoxide-containing fluid to said first oxidation catalyst device to generate an exotherm in said first oxidation catalyst to heat an exhaust fluid passing through said first oxidation catalyst to a temperature effective to desulfate said NOx adsorber; and
   a second valve in flow communication with said source of reformate for controlling said hydrogen- and carbon monoxide-containing fluid to said NOx adsorber, wherein said source of reformate is in parallel flow with said exhaust conduit.

8. The system of claim 7, wherein said source of reformate is a partial oxidation reformer.

9. The system of claim 7, further comprising:
   a particulate filter having an inlet in fluid communication with said exhaust conduit, and an outlet,
   a second oxidation catalyst having an inlet in fluid communication with said exhaust conduit and said outlet of said NOx adsorber, and an outlet in fluid communication with said inlet of said particulate filter, said second oxidation catalyst device being separate from said particulate filter and disposed upstream of said particulate filter, said outlet of said source of reformate in fluid communication with said exhaust conduit upstream of said second oxidation filter; and
   a third valve in flow communication with said source of reformate for controlling said hydrogen- and carbon monoxide-containing fluid to said second oxidation catalyst.

10. The system of claim 7, wherein said $NO_x$ adsorber comprises a support, a catalytic metal component, and a $NO_x$ trapping material.

11. The system of claim 10, wherein said catalytic metal is selected from the group consisting of platinum, palladium, rhodium, iridium, osmium, ruthenium, tantalum, zirconium, yttrium, cerium, aluminum, nickel, copper, and mixtures thereof.

12. The system of claim 10, wherein said support is a porous material selected from the group consisting of alumina, gamma-alumina, zirconia, alpha-alumina, magnesium oxide cerium oxide, zirconium oxide, lanthanum oxide, yttrium oxide, neodymium oxide, and mixtures thereof.

* * * * *